United States Patent [19]

Turpin

[11] 4,322,134
[45] Mar. 30, 1982

[54] ELECTRONIC LENS

[75] Inventor: Terry M. Turpin, Ellicott City, Md.

[73] Assignee: Director, National U.S. Government, Security Agency, Washington, D.C.

[21] Appl. No.: 565,032

[22] Filed: Apr. 4, 1975

[51] Int. Cl.³ .............................................. G02F 1/29
[52] U.S. Cl. .................................. 350/361; 315/369; 315/370
[58] Field of Search ................... 178/7.5 D, DIG. 29, 178/DIG. 39; 358/6 L, 233, 139, 231–235; 315/307, 369, 370, 387; 350/161 R, 162 ZP, 162 SP, 331, 332, 348, 355, 356, 359, 360, 361; 250/199

[56] References Cited

U.S. PATENT DOCUMENTS

| | | | |
|---|---|---|---|
| 2,604,534 | 7/1952 | Graham | 315/370 |
| 3,325,592 | 6/1967 | Good et al. | 358/62 |
| 3,402,001 | 9/1968 | Fleisher | 350/162 ZP |
| 3,499,703 | 3/1970 | DeBitetto | 350/162 ZP |
| 3,538,251 | 11/1970 | Gear | 178/7.87 |
| 3,612,760 | 10/1971 | McKechnie | 358/139 |
| 3,619,717 | 11/1971 | Lee et al. | 178/DIG. 29 X |
| 3,626,084 | 12/1971 | Wohl et al. | 350/361 X |
| 3,653,742 | 4/1972 | Buchan | 350/162 ZP |
| 3,700,902 | 10/1972 | Buchan | 350/162 SF X |
| 3,723,651 | 3/1973 | Gorog | 178/7.5 D |
| 3,761,616 | 9/1973 | Timberlake | 178/7.87 X |
| 3,861,784 | 1/1975 | Torok | 350/3.7 X |
| 3,869,567 | 3/1975 | Covington | 178/DIG. 39 |
| 3,878,328 | 4/1975 | Marie et al. | 178/DIG. 39 X |
| 3,886,310 | 5/1975 | Guldberg | 178/7.5 D |
| 3,919,473 | 11/1975 | Cotter | 178/DIG. 39 X |

OTHER PUBLICATIONS

IBM Technical Disclosure Bulletin, Dec. 1965, vol. 8, No. 7, p. 1019.

*Primary Examiner*—Aristotelis M. Psitos
*Attorney, Agent, or Firm*—John R. Utermohle; Thomas O. Maser; Barry N. Young

[57] ABSTRACT

An coherent light optical system is described wherein a high frequency electrical signal modulates an optical signal. An electronic lens, whose optical properties may be easily controlled, results from control of the modulating signal. The principles of feedback are utilized for optical aberration detection and correction of the lens.

8 Claims, 5 Drawing Figures

TRANSFORM PLANE  IMAGE PLANE

ELECTRONIC LENS

BACKGROUND OF THE INVENTION a. Field of the Invention

This invention relates generally to the field of optics, and more particularly to the control of optical signals by electronic means.

b. Description of the Prior Art

Methods are known in the prior art which utilize a light value projection apparatus and a fluid medium which may be deformed by a scanning electron beam to modulate an optical signal. For example, U.S. Pat. No. 3,450,462 to Good et al. described such a system for use in a color television. Also disclosed is a complex lens system which must be used to focus and project the modulated optical signal after it has passed through the liquid medium. Many imaging and optical processing systems require complex lens systems. Occasionally such lens systems are beyond the state of the art of current optical fabrication techniques. It is desirable to have a means for easily and cheaply altering a lens system to provide unlimited diversity of the optical properties available within a single system. Additionally, when a coherent light value or other spatial light modulator is used in an optical system, the device itself creates phase distortions in optical signals. One source of distortion is the lack of optical flatness in the modulating device. Additional distortion is created by any nonlinearity existing in the electron beam scanner. It is further desirable to have a means for detecting and correcting these distortions.

SUMMARY OF THE INVENTION

It is an object of this invention to provide an optical system wherein the optical properties may be electronically controlled.

It is a further object to provide such a system wherein the optical properties are infinitely variable.

It is a still further object to provide an optical system wherein the optical properties may be varied by the application of a high frequency modulating electrical signal.

It is yet a further object to provide an electrical means for detecting and correcting for optical distortion.

It is also an object to provide apparatus which will detect both scan nonlinearity and phase error within an optical system and provide electronic correction therefor.

An apparatus having the desirable attributes described above may include a source of optical signals and apparatus for electronically applying a phase shift characteristic to the optical signals such that the optical properties of the optical signal may be controlled in a predetermined manner. In a more specific application, the resulting optical signal may be fed into an aberration detection and correction apparatus, that apparatus providing an electronic phase shift to correct the aberration.

BRIEF DESCRIPTION OF THE DRAWINGS

The preferred embodiment to be described in detail herein below may be more clearly understood when considered together with the attached drawings, in which.

DESCRIPTION OF THE PREFERRED EMBODIMENT

Any given optical lens may be described mathematically as a function, $\phi(x, y)$, which defines the total phase delay suffered by a wave at coordinates (x, y), in passing through the lens. More detailed treatment of this representation, and other concepts utilized in the apparatus to be described, may be found in Goodman, J. W. *Introduction to Fourier Optics*, N.Y., McGraw-Hill, 1968, Chapter 5, p. 77–100. By utilizing a light valve of the type described in U.S. Pat. No. 3,450,462 to Good et al., an electron gun may be used to write appropriate diffraction gratings onto a transparent oil film. Proper control of the gratings modulates a light beam in a predictable manner.

A given lens, $\phi(x, y)$, may be created by first setting y=o and defining the first line on the light valve as:

$$L_1(t) = \cos[\omega t + \phi(vt, o)], \quad t = o \text{ to } T_o$$

where $v$ = horizontal scan velocity $\omega_o$ = carrier frequency of signal used to write the diffraction gratings on the oil film $T_o$ = line-to-line period.

Similarly, the signal corresponding to the second line is $$L_2(t) = \cos[\omega_o t + \phi(vt, \Delta y)], \quad t = T_o \text{ to } 2T_o$$

where $\Delta y$ is the line-to-line spacing of the raster scanner.

In general, $$L_n(t) = \cos[\omega_o t + \phi(vt, n\Delta y)], \quad t = (n-1)T_o \text{ to } nT_o$$

and $$L(t) = \sum_{n=o}^{n} \cos[\omega_o t + \phi(vt, n\Delta y)] \, \delta\left(\left|\frac{t}{T_o}\right| - n\right) \quad (1)$$

where $|t/T_o|$ means the largest integer less than $t/T$ and the function $\delta$ is defined as $\delta(x) = 1$ if $x = o$ $\delta(x) = o$ if $x = \neq 0$.

It is necessary to select $\omega_o$ such that the positive and negative frequency components do not mix.

Figure 1:
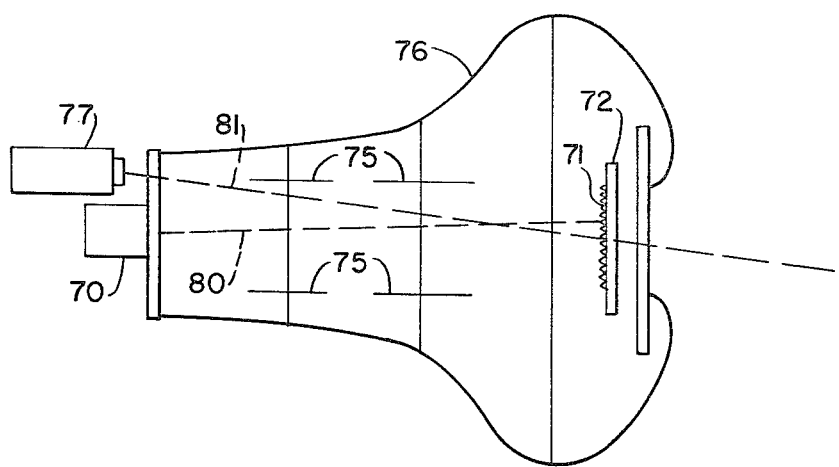
FIG. 1 is a coherent light valve suitable for use in the invention.

The apparatus of FIG. 1 provides a means of modulating an optical beam in the manner described herein above.

Figure 2:
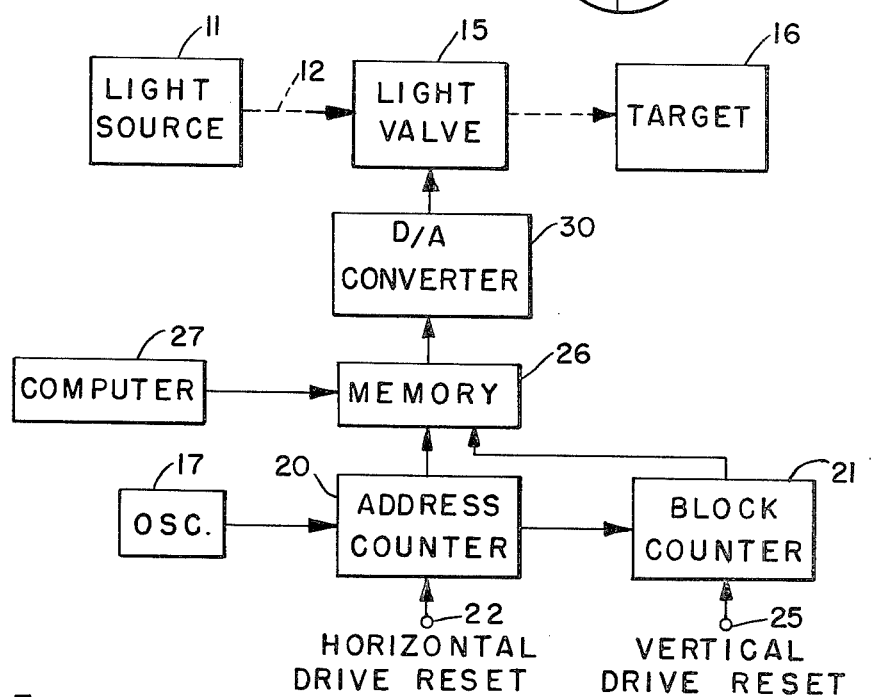
FIG. 2 is a block diagram of an electronic lens system embodying the invention.

A coherent light valve known in the prior art and which is suitable for use with this invention is shown in FIG. 1. Its major features include an electron gun 70 whose target is a deformable liquid 71 on a substrate 72. Electrostatic deflection plates 75—75 provide a means for writing information onto the target by scanning the target with the electron beam 80 in a television raster format. The light valve operates in a vacuum environment which is retained by a casing 76. A coherent light souce 77, external to the light valve, provides a light beam 81 which is modulated as it passes through the liquid 71. Referring to FIG. 2, a light source 11 images a coherent light beam 12 through a light valve 15 and onto a target 16 such as a screen or similar display apparatus. An oscillator 17, adjusted to provide a pulse rate equal to the raster scan rate, steps an address counter 20 and, either directly or indirectly through counter 20, steps a block counter 21. Address counter 20 may be reset to "1" by a pulse applied to input terminal 22, and block counter 21 may be reset to "1" by a pulse applied to input terminal 25. A memory 26 is controlled by a computer 27 to selectively receive and store data from the address counter 2 and to provide data to a digital-to-analog converter 30. A signal from the digital-to-analog converter 30 controls the light valve 15.

The apparatus of FIG. 2 operates by first computing, generally with the aid of computer 27, and then storing in memory 26, the signal as defined by equation (1) for the lens to be produced. The oscillator 17 is phase-locked to the horizontal drive of the raster within the light valve, and provides a pulse whose rate is at least great enough to satisfy the Nyquist criteria for the lens. In general, a rate on the order of 6 megahertz will be sufficient. The address counter 20 is caused to count sequentially from "1" to the number of horizontal points on the raster scanner, at which time it is reset by a pulse applied to terminal 22 to begin the next horizontal row. The block counter 21 is also initially set to "1" and counts sequentially to the number of vertical points on the raster scanner at which time it is reset by a pulse applied to terminal 25. For example, if the raster scanner included a 32×32 matrix, the block counter would remain at "1" while the address counter stepped from "1" to "32". The block counter would then increase to "2" while the address counter stepped from "1" to "32", etc. Upon the block counter and the address counter both reaching "32", one scan cycle is complete and the counters are both reset to "1" to begin the next cycle. A digital-to-analog converter 30 receives the output from the appropriate memory location on each scan pulse and provides to the light valve 15 an anlog signal representative of the valve of L(t). This signal may be used to properly modulate the optical beam in either of two ways. It is effective either to utilize the signal directly to modulate the beam current grid, or to add a carrier signal and velocity modulate the optical beam by applying the signal to the horizontal deflection plates. By either method, the optical beam from the light source 11 is appropriately modulated to produce a beam having the desired optical characteristics at the target 16.

The apparatus of FIG. 2 may also be incorporated into a conventional light valve imaging system to perform aberration correction and detection functions. A Fourier optical system is shown graphically in FIG. 3. A coherent light beam 35 passes from a light valve 36 through a lens 37 and a diffraction grating 40 to a light detecting videcon 41. The lens 37 may be either of the conventional type or the electronic lens as described herein above. In the optical representation, a light beam passes first through the object plane $T_o$, located within the light valve. The light amplitude distribution in the transform plane $T_1$ is the Fourier transform of the light amplitude in the object plane, and the light amplitude in the image plane $T_2$ is the inverse Fourier transform of the amplitude distribution in the transform plane $T_1$.

In further explaining the operation of the system it is useful to adopt the following definitions:

$f(x, y)$ = the light amplitude distribution in the object plane $F(\omega_x, \omega_y)$ = the light amplitude distribution in the transform plane $g(\xi, \eta)$ = the light amplitude distribution in the image plane $\phi_x(x, y)$ = the phase distortion due to horizontal deflection nonlinearities. This distortion is measured at a horizontal spatial frequency or $\omega_{xr}$.

$\phi_y(x, y)$ = the phase distortion due to vertical deflection nonlinearities. This distortion is measured at a vertical spatial frequency of $\omega_y$.

$\phi_z(x, y)$ = the phase distortion due to non-uniformity in oil film thickness. This aberration is frequency independent.

Figure 3:
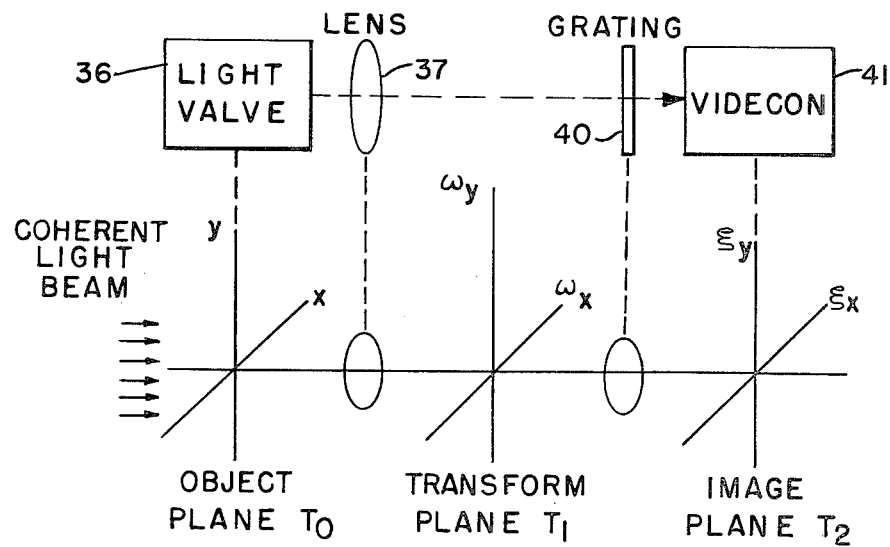
FIG. 3 relates certain physical portions of the optical system to a graphical representation thereof.

In the optical system of FIG. 3 the following relationships hold:

$$F(\omega_x, \omega_y) = \int\int f(x, y)e^{j(\omega_x x + \omega_y y)} dx\, dy$$

$$g(\xi, \eta) = f(\xi, \eta) = \frac{1}{2\pi} \int\int F(\omega_x, \omega_y)e^{-j(\omega_x x + \omega_y y)} d\omega_x\, d\omega_y$$

Nonlinearities inherent in the raster scanner produce geometric distortions in data entered into the light valve. If the input data is thought of in terms of its spatial frequency components, then these geometric distortions produce phase distortions in these spatial frequencies, the phase distortions being far worse at high spatial frequencies than at low frequencies. For example, a distortion of 100 microns is only 1/100th of a wave at a frequency of 1 cycle/cm but is a 10 wave phase distortion at 1000 cycles/cm. If the horizontal phase distortion at a frequency $\omega_{xr}$ is $\omega_x(x, y)$ then the phase distortion at any other horizontal frequency $\omega_x$ is $\omega_x/\omega_{xr}\omega_x(x, y)$. An identical relationship holds for the vertical deflection system.

Sensing Scan Nonlinearity

Figure 4:
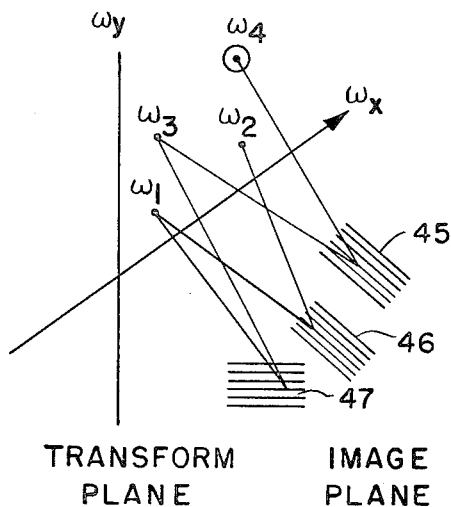
FIG. 4 depicts the relationship between the location of calibration signals in the transform plane to their representation in the image plane.

To sense the horizontal scan error, two frequencies, $\omega_1$ and $\omega_2$, are recorded on the light valve. An example of the location of these frequencies in the transform plane is shown in FIG. 4. The light amplitude distribution in the image plane can then be written as:

$$I(\xi,\eta) = \{e^{j\phi_x(\xi,\eta)}\}\left\{ e^{j[\omega_y 1\eta + \frac{\omega_{y1}}{\omega_{yr}}\phi_y(\xi,\eta)]} \right\} \quad (2)$$

$$\left\{ e^{j[\omega_{x1}\xi + \frac{\omega_{x1}}{\omega_{xr}}\phi_y(\xi,\eta)]} + e^{j[\omega_{x2}\xi + \frac{\omega_{x2}}{\omega_{xr}}\phi_y(\xi,\eta)]} \right\}.$$

It may be noted that $\omega_1$ and $\omega_2$ will have sidebands in the transform plane due to $\omega_x$, $\omega_y$ and $\omega_z$. The term involving $\omega_z$ is common to all frequencies and can be factored out as the first term in equation (2). The term involving $\omega_y$ and $\omega_z$ is common for $\omega_1$ and $\omega_2$ because they have been selected such that $\omega_{y1} = \omega_{y2}$. This term is factored out as the second term in equation (2). The terms involving the horizontal nonlinearity function $\omega(x, y)$ are not common and produce a fringe system or pattern in the image plane as depicted at 46 in FIG. 4. This fringe system is phase modulated by the horizontal nonlinearity $\omega_x(\xi,\eta)$, which becomes apparent when the power in the image plane is calculated from equation (2). This power distribution is given by:

$$|I(\xi,\eta)|^2 = P(\xi,\eta) = \quad (3)$$
$$2\left\{1 + \cos\left[(\omega_{x2} - \omega_{x1})\xi + \frac{\omega_{x2} - \omega_{x1}}{\omega_{xr}}\phi_x(\xi,\eta)\right]\right\}.$$

The fringe system defined in equation (3) has a spatial frequency in the $\omega_x$ direction equal to the difference between the $\omega_x$ components of $\omega_1$ and $\omega_2$ and the phase distortion term is multiplied by this difference. If the $\phi_x(\xi,\eta)$ effect is to be large, then $(\omega_{x2}-\omega_{x1})$ must be large. This, however, implies that the fringe system of equation (3) must have a high spatial frequency, and hence will be difficult to view. The fringe system can be hetrodyned with a diffraction grating in the image plane to make the phase term more apparent. The ruling has an intensity transmittance:

$$T(\xi,\eta) = (\tfrac{1}{2})\{1 + \cos[(\omega_{x2} - \omega_{x1})\xi]\}. \quad (4)$$

The light intensity immediately beyond the grating will then be the product of the grating transmittance and the input power distribution as in:

$$P(\xi,\eta)T(\xi,\eta) = \{1 + \cos[(\omega_{x2}-\omega_{x1})\xi]\} \quad (5)$$
$$\left\{1 + \cos\left[(\omega_{x2} - \omega_{x1})\xi + \frac{\omega_{x2} - \omega_{x1}}{\omega_{xr}}\phi_x(\xi,\eta)\right]\right\}.$$

Equation (5) may be written in terms of sum and difference frequencies as:

$$P(\xi,\eta)T(\xi,\eta) = \cos[(\omega_{x2}-\omega_{x1})\xi] + \quad (6)$$
$$\cos\left[(\omega_{x2}-\omega_{x1})\xi + \frac{\omega_{x2}-\omega_{x1}}{\omega_{xr}}\phi_x(\xi,\eta)\right] +$$
$$(\tfrac{1}{2})\cos\left[2(\omega_{x2}-\omega_{y2})\xi + \frac{\omega_{x2}-\omega_{x1}}{\omega_{xr}}\phi_x(\xi,\eta)\right] +$$
$$(\tfrac{1}{2})\cos\left[\frac{\omega_{x2}-\omega_{x1}}{\omega_{xr}}\phi_x(\xi,\eta)\right].$$

In the system described herein, the signals used for error sensing are located outside of the information passband and are turned on or off under control of the system computer. All of the terms in equation (6) have high spatial frequency with the exception of the term which is the difference frequency between the fringe system and the diffraction grating. When viewed with a low resolution sensor, only this term will be visible. For convenience this term will be called $C_x(\xi,\eta)$, which may be defined:

$$C_x(\xi,\eta) = (\tfrac{1}{2})\cos\left[\frac{\omega_{x2}-\omega_{x1}}{\omega_{xr}}\phi_x(\xi,\eta)\right].$$

An identical treatment can be given to the problem of sensing vertical scan nonlinearity and will generate a term analogous to $C_x(\xi,\eta)$ which will be called $C_y(\xi,\eta)$ and is defined:

$$C_y(\xi,\eta) = (\tfrac{1}{2})\cos\left[\frac{\omega_{y2}-\omega_{y1}}{\omega_{yr}}\phi_y(\xi,\eta)\right].$$

A fringe pattern 47 (FIG. 4) is produced in a manner identical to pattern 46. By sensing $C_x$ and $C_y$, both horizontal and vertical scan nonlinearities can be determined.

Sensing Phase Errors

The sensing of the phase errors due to oil film thickness requires a modification of the techniques just described. To sense the phase error, two frequencies $\omega_3$ and $\omega_4$ are recorded on the light valve. A pinhole filter is placed in the transform plane to remove the sidebands caused by scan nonlinearity and thickness variations. The light amplitude distribution in the image plane is now given by:

$$I(\xi,\eta) = \quad (8)$$
$$e^{j\omega_{y3}}\left\{e^{j[\omega_{x3}\xi + \frac{\omega_{x3}}{\omega_{xr}}\phi_x(\xi,\eta) + \frac{\omega_{y3}}{\omega_{yr}}\phi_y(\xi,\eta) + \phi_z(\xi,\eta)]} + e^{j\omega_{x4}\xi}\right\}.$$

A graphical representation of these relationships is shown at 45 of FIG. 4. If $\omega_3$ is selected near the origin such that $\omega_{x3}$ and $\omega_{y3}$ are small compared to $\omega_{xr}$ and $\omega_{yr}$ respectively, then the $\phi_x$ and $\phi_y$ terms will be small and can be considered zero. A more general selection of $\omega_3$ is possible if $\phi_x$ and $\phi_y$ have been removed by scan correction before the determination of $\phi_z$ is attempted. The light intensity in the image plane can then be written as:

$$|I(\xi,\eta)|^2 = 2\{1+\cos[(\omega_{x3}-\omega_{x4})\xi + \omega_z(\xi,\eta)]\} \quad (9)$$

When this fringe system is hetrodyned with a diffraction grating which has a transmittance given by:

$$T(\xi,\eta) = (\tfrac{1}{2})\{1+\cos[(\omega_{x3}-\omega_{x4})\xi]\}, \quad (10)$$

the resulting low frequency term is:

$$C_z(\xi,\eta) = (\tfrac{1}{2})\cos\phi_z(\xi,\eta) \quad (11)$$

Thus, scan nonlinearity and oil thickness variations can be determined by feeding appropriate frequency pairs to the light valve and beating the resulting fringe pattern with a reference grating.

THE SCAN CORRECTING SYSTEM

Figure 5:
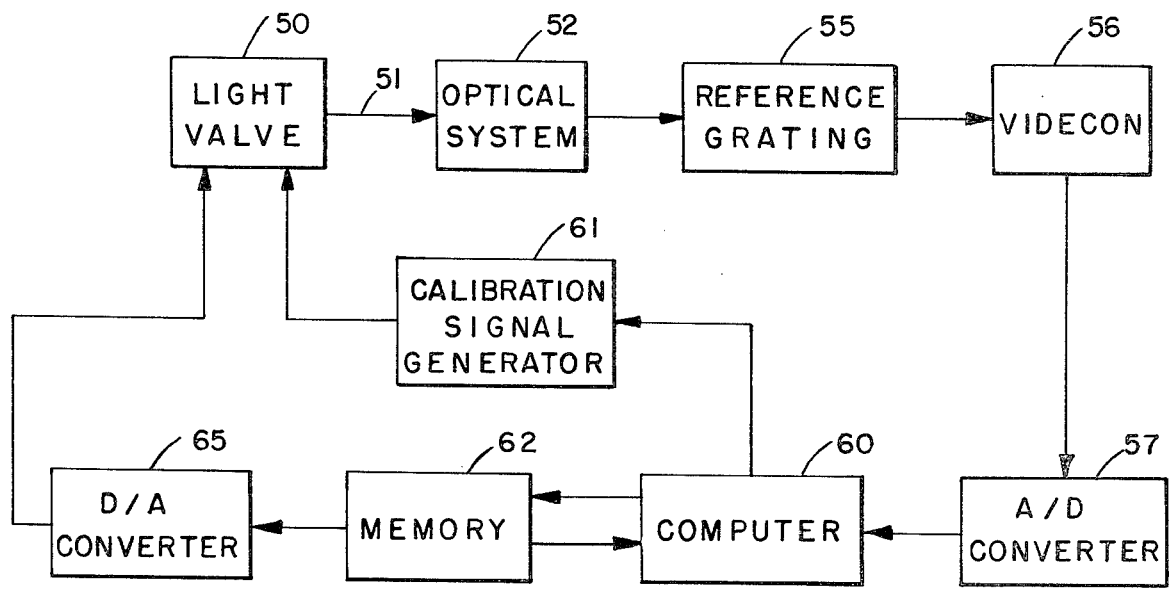
FIG. 5 is a block diagram of a detection and correction apparatus embodying the invention.

FIG. 5 illustrates a system for the correction of both scan nonlinearity and aberrations caused by nonuniformity in oil film thickness. A light valve 50 projects a light beam 51 through an optical system 52 and a reference grating 55 onto a videcon 56 or similar light amplitude sensitive device. Signals indicative of the light amplitude striking the videcon are passed through an analog-to-digital converter 57 to a computer 60. A calibration signal generator 61 is controlled by the computer 60 to provide appropriate correction signals to the light valve 50. A memory 62 stores information being processed by the computer 60 and provides selected signals to a digital-to-analog converter 65 which in turn supplies information to the light valve 50.

The system of FIG. 5 is operated in a calibration mode before data is provided to the light valve 50. The computer 60 is programmed to command the calibration signal generator 61 to supply the appropriate pair of signals to the light valve. The optical system 52 then images the resulting fringe system onto a reference grating 55. When the raster line spacing is adjusted to correspond to the diffraction grating line spacing, the resulting Moire pattern defines the aberration. More specifically, a bright area represents correspondence between the raster and the grating, while a dark area indicates misalignment. The Moire pattern is sensed by imaging onto a videcon 56, whose face is divided into a matrix arrangement. Thus, the Moire pattern is divided into a matrix, and the error pattern is sampled by the videcon in each cell of the matrix. The resulting analog signal is digitized by the analog-to-digital converter 57, for input into computer 60. The computer than calculates the appropriate correction voltage on a cell-by-cell basis and dumps the correction into a memory 62, whose output is synchronized with the scan pattern. This memory is accessed by a counter designed to address the proper correction for a given cell when the light valve beam is scanning that cell. The correction is then converted to a voltage or current in the digital-to-analog converter 65, and is fed directly to the sweep circuitry of light valve 50 if the correction is for deflection linearity, or used to control the electronic phase of the carrier signal if the correction is for optical phase shift due to non-uniformities in the oil film thickness.

The correction algorithm tries to achieve a maximum brightness across the entire error pattern. While any number of ways might be devised to perform this function, a preferred method is to begin with the center cell of the matrix. For example, if a 32×32 matrix is used, three correction signals ($V_1$, $V_2$ and $V_3$) equally spaced in amplitude, are sequentially applied to cell (16,16), where cells are designated by the number of the row and column of the matrix in which they are located, i.e., (16, 16) refers to the cell in row 16, column 16. The brightness of the error function ($C_1$, $C_2$ and $C_3$) of cell (16, 16) corresponding to each correction voltage ($V_1$, $V_2$ and $V_3$) is measured with the error sensor. The computer then calculates the parabola that best fits the three points ($V_1$, $C_1$), ($V_2$, $C_2$) and ($V_3$, $C_3$). The peak of the parabola is taken as a first estimate of the best correction signal to maximize brightness. However, this is used as the final correction for a cell only if it falls between points ($V_1$, $C_1$) and ($V_3$, $C_3$). If the peak does not fall between points ($V_1$, $C_1$) and ($V_3$, $C_3$) then the best correction is used as the new center point and two new points are selected on each side of it. If the best correction point fails to fall in the middle within some predetermined number of trails, for example 5, an error message is generated. The separation of the amplitude of the signals $V_1$, $V_2$ and $V_3$ is a constant, and a voltage difference between each successive correction signal that produces 1/5 of a wave phase shift has been shown to work well by experiment. After cell (16, 16) has been corrected the cells (16, 15) to (16, 1) are corrected sequentially. The algorithm can then correct column one, working up and down from the center. When the first column corrections are complete the columns may be corrected in order from left to right. The horizontal line corrections are applied to an integrator so the correction waveform will be a straight line segment approximation to the error function rather than a series of steps. This requires that the first column of corrections be an initial value and the remainder of the corrections across a line be differences. To minimize the total error correction required, the center of the target is taken as the reference.

The above description is of a preferred embodiment of my invention, and various obvious modifications and additions may be made without departing from the intent thereof.

I claim:

1. An optical system, comprising:
   a coherent light beam;
   a deformable liquid target within the path of the light beam, said target including a plurality of indentifiable scan points defined by a raster format;
   a means for scanning the target in said raster format, thereby modulating said light beam;
   means for recording a pair of frequencies on the target, thereby creating a fringe pattern modulated by target aberrations;
   a diffraction grating for heterodyning said fringe pattern;
   means for detecting variations in light intensity of said heterodyned fringe pattern resulting from said aberrations; and
   means within the path of said light beam for detecting phase distortion in said coherent light beam resulting from non-linearities in said scanning or the passage of said coherent light beam through said target.

2. Apparatus for aberration detection and correction of an optical signal, comprising:
   a light beam;
   a deformable liquid target within the path of the light beam, said target including a plurality of identifiable scan points;
   scanning means for recording a pair of frequencies on the target, thereby creating a fringe pattern modulated by target aberrations;
   a diffraction grating for heterodyning said fringe pattern;
   means for detecting at each scan point variations in light intensity of said heterodyned fringe pattern resulting from said aberrations; and
   means for applying a correcting signal at each scan point on said target and in synchronization with said scanning means to substantially eliminate said aberrations.

3. An optical system comprising:
   means for providing an optical beam;
   means for electronically applying a phase shift characteristic to an electrical signal, said means including a light value having a deformable target and a scanning electron beam and means for writing a diffraction grating on said target by utilizing said electrical signal to modulate said electron beam, said phase shift characteristic corresponding to a predetermined lens function which defines the phase delay suffered by an optical beam in passing through an optical lens described by said lens function; and
   means for phase modulating said optical beam with said electrical signal such that said phase shift characteristic is applied to said optical beam, thereby controlling its optical properties in the same manner as said optical properties would be controlled by passing said optical beam through said optical lens described by said lens function.

4. The apparatus of claim 3 wherein the means for modulating said optical beam further includes
means for scanning the target with said electron beam in a raster format.

5. The apparatus of claim 3 wherein the target includes a plurality of identifiable scan points defined by said raster format.

6. The apparatus of claim 5 wherein the means for modulating said optical beam to apply a phase shift characteristic includes means for applying a phase shift to said optical beam at each scan point on said target.

7. An optical system comprising:
means for providing an optical beam;
means for electronically applying a phase shift characteristic to a high frequency carrier signal, said means including means for modulating the phase of said high frequency carrier signal with said phase shift characteristic, said phase shift characteristic corresponding to a predetermined lens function which defines the phase delay suffered by an optical beam in passing through an optical lens described by said lens function; and
means for phase modulating said optical beam with said electrical signal such that said phase shift characteristic is applied to said optical beam, thereby controlling its optical properties in the same manner as said optical properties would be controlled by passing said optical beam through said optical lens described by said lens function.

8. The apparatus of claim 7 wherein the lens may be dynamically altered by altering the phase shift characteristic applied to said carrier signal.

* * * * *